United States Patent [19]

Smith

[11] Patent Number: 4,465,809

[45] Date of Patent: Aug. 14, 1984

[54] CONVERSION OF POLYMER LITHIUM TO POLYMER CARBOXYLATE

[75] Inventor: Richard L. Smith, Bartlesville, Okla.

[73] Assignee: Phillips Petroleum Company, Bartlesville, Okla.

[21] Appl. No.: 439,508

[22] Filed: Nov. 5, 1982

[51] Int. Cl.$^3$ ............................................. C08F 8/46
[52] U.S. Cl. .................................. 525/284; 525/285; 525/332.9; 525/385
[58] Field of Search ..................... 525/385, 332.9, 284, 525/285

[56] References Cited

U.S. PATENT DOCUMENTS

| | | | |
|---|---|---|---|
| 3,055,952 | 9/1962 | Goldberg | 260/635 |
| 3,175,997 | 3/1965 | Hsieh | 260/85.1 |
| 3,308,170 | 3/1967 | Pritchett et al. | 260/632 |
| 3,668,279 | 6/1972 | Loveless et al. | 260/879 |
| 3,842,050 | 10/1974 | Milkovich et al. | 525/385 |
| 4,020,036 | 4/1977 | South, Jr. | 260/862 |
| 4,083,834 | 4/1978 | Komatsu et al. | 525/385 |
| 4,321,352 | 3/1982 | Matsuda | 525/385 |

*Primary Examiner*—Joseph L. Schofer
*Assistant Examiner*—Bernard Lipman
*Attorney, Agent, or Firm*—French, Hughes and Doescher

[57] ABSTRACT

A carboxylate component is introduced into an alkali metal initiated polymer by means of a sequence in which an epoxy compound is reacted with the polymer followed directly by contact with a cyclic acid anhydride to produce a polymer composition having a carboxylate salt group. The resulting composition can then be hydrolyzed to produce carboxy-containing polymer which is useful in applications such as sheet molding compounds.

15 Claims, No Drawings

CONVERSION OF POLYMER LITHIUM TO POLYMER CARBOXYLATE

BACKGROUND OF THE INVENTION

This invention relates to carboxy terminated polymers.

Normally solid carboxy-containing polymers of conjugated dienes alone or copolymerized with vinyl aromatic monomers have utility as modifiers in thermosetting polyester resin compositions as disclosed in U.S. Pat. No. 4,020,036. These carboxy-containing polymers can be made by variety of methods as disclosed in the above patent. One method for making such carboxy-containing polymers is based on solution polymerization techniques wherein the monomers such as 1,3-utadiene and styrene are polymerized in a solution with a hydrocarbyl lithium initiator under conditions such that a block copolymer of butadiene and styrene is formed. The polymerization mixture is then contacted with carbon dioxide to convert the polymerlithium to polymer-carboxy-lithium. The carbonated reaction mixture can be further treated under hydrolysis conditions to convert the carboxy-lithium end group to a carboxylic acid end group during polymer recovery operations.

While straightforward in theory, the carbonation procedure for preparing carboxy-containing polymers has certain disadvantages. First, the carbonation procedure requires a very high efficiency of mixing during the reaction of the polymerlithium in hydrocarbon solution with carbon dioxide in order to achieve a high degree of carboxy content in the final polymer. Thus, expensive, specially constructed mixing equipment is generally used for the carbonation step. Carbonation with $CO_2$ can also be improved by using a large excess of $CO_2$ ($>40$ times stoichiometric amount) and low reaction temperature ($>25°$ C.). But these conditions are not commercially attractive. Even under very good mixing conditions an appreciable portion of the polymer product does not contain a carboxyl group because of a competing coupling reaction which involves an intermediate polymer molecule containing a carboxy group or carboxylate salt group. While the presence of the coupled product in the final polymer is not always deleterious it has been difficult to control reproducibly the content of coupled polymer in the carboxy-containing polymers made under the solution polymerization/carbonation process. It is evident that as the coupled polymer content increases the carboxy content of the polymer product will decrease. Thus, if the coupling reaction is difficult to control reproducibly, the carboxy content of the polymer produced under such conditions will also be difficult to control.

It is desirable that the carboxy content of the carboxy-containing polymers employed in thermosetting polyester resin compositions be as high as practicable and that the carboxy content be reproducibly obtained in a process for making such carboxy-containing polymers.

SUMMARY OF THE INVENTION

It is an object of this invention to provide a simplified method for producing carboxy terminated polymer;

It is a further object of this invention to provide a method for producing carboxy terminated polymer which is less dependent on vigorous mixing;

It is still a further object of this invention to provide a process giving better reproducibility in production of carboxy terminated polymer;

It is still yet a further object of this invention to provide a higher degree of carboxy incorporation; and It is still yet a further object of this invention to provide a more precise control over coupling during carboxylation reactions.

In accordance with this invention, an alkali metal terminated polymer is contacted with an epoxy compound and directly thereafter with a cyclic anhydride to produce a polymer carboxylate composition.

DESCRIPTION OF THE PREFERRED EMBODIMENTS

Thus, it has now been found that a simple process can be employed for the production of carboxy-containing polymers utilizing the solution polymerization process but which does not require expensive mixing equipment and meticulous control of the mixing step or excess reagent ($CO_2$) and low reaction temperature as in the carbonation procedure. Moreover, this simple process provides carboxy-containing polymers which can be reproducibly made to a very high content of the carboxy group with substantially no coupled polymer being produced. However, if coupled polymer is desired the inventive process of this invention can be employed to reproducibly make polymer having the desired level of coupled product in the carboxy-containing polymer product.

The invention process employs first contacting a polymer-alkali metal composition with an epoxy compound (oxirane compound) in order to convert the polymer metal to a polymer oxy-metal intermediate product. In the second step of the inventive process, the thus-formed intermediate product is thereafter directly contacted with a cyclic acid anhydride still under solution conditions to produce a polymer composition having a carboxylate salt group present on the polymer chain. By "directly contacted" is meant that there is no intermediate hydrolysis step. Generally, the anhydride will be reacted immediately after the first reaction but this is not essential so long as no hydrolysis is carried out prior to adding the anhydride. Said polymers having the carboxylate salt group can then be hydrolyzed if so desired during conventional isolation procedures to provide carboxy-containing polymers which can be utilized in thermosetting resin compositions as well as in other applications.

It should be noted that the prior art discloses the reaction of polymer metal with epoxy compounds to produce polymer oxy-metal species. It is further known that such materials can be hydrolyzed to form polymers containing hydroxyl groups. Said polymers which contain hydroxyl groups are known to react with cyclic acid anhydrides to form polymeric materials containing carboxy groups. This latter reaction is disclosed in U.S. Pat. No. 4,020,036 in column 3 lines 11-18. A similar disclosure is found in U.S. Pat. No. 3,308,170 at column 3 lines 55-69 and column 4 lines 52-69. Contrary to the teachings of these patents the instant invention employs no intermediate hydrolysis step after the formation of the polymer oxy-metal from polymer metal and the epoxy compound. Surprisingly it has been found that the omission of the hydrolysis step at this stage provides a very high carboxy content in the final product when compared to the typical carbonation procedure for producing carboxy-containing polymers. Moreover, it has been found that the use of an intermediate hydrolysis step as taught by the prior art but without isolation of the produced hydroxy-containing polymer provides a very low yield of carboxy-containing polymer when the intermediate hydrolyzed mixture is reacted with the cyclic acid anhydride at relatively high temperatures (110°–120° C.).

The polymerization procedure to produce the block polymers is broadly known as disclosed in Zelinski et al, Rubber Chemistry and Technology, 41 161–181, (1968), particularly pages 162 to 166, the disclosure of which is hereby incorporated by reference. The initiator is preferably an organolithium such as n-butyllithium as disclosed in British Pat. No. 895,980, the disclosure of which is hereby incorporated by reference but can be any organoalkali metal initiator as disclosed in Hsieh, U.S. Pat. No. 3,175,997 (Mar. 30, 1965), the disclosure of which is hereby incorporated by reference. Similarly, the monomers disclosed in said Hsieh patent are applicable to the polymers used in the invention. For example, suitable monomers include conjugated dienes having 4 to 12, preferably 4 to 8 carbon atoms per molecule such as 1,3-butadiene and isoprene, and monovinyl-substituted aromatic compounds having from 8 to 18 carbon atoms per molecule such as styrene. Preferably, the polymers are copolymers produced by sequential addition of the monomers. More specifically, the invention is applicable to the production of carboxy terminated rubber, i.e., compositions having at least 50 weight percent of the conjugated diene such as 1,3-butadiene, preferably 90 to 80 weight percent diene, such as 1,3-butadiene, and 10 to 20 weight percent of monovinyl-substituted aromatic compound such as styrene. With copolymers the order of addition is generally such that the alkali metal is on the diene, however, the reverse order is possible also.

The reaction, as an example of the invention, can be graphically depicted by the following reaction:

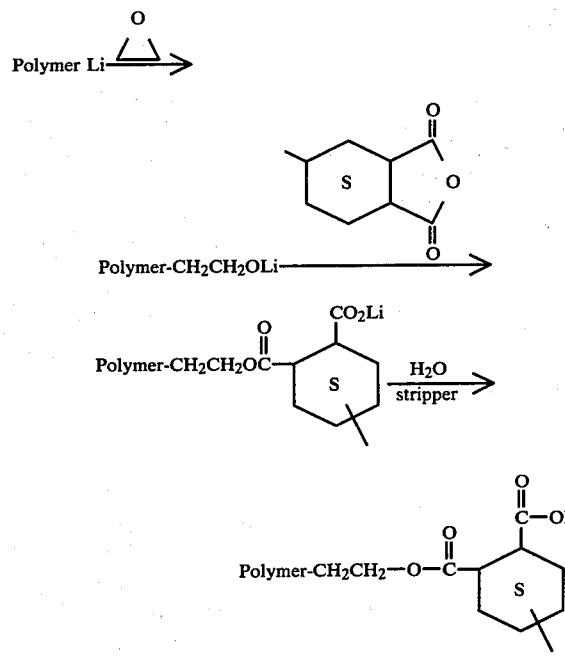

The epoxy compounds which can be employed to react with polymer-lithium in the first step of the inventive process can be defined by the general formula shown below

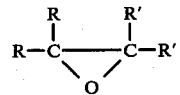

wherein each R and each R' is selected from the group consisting of hydrogen, alkyl, aryl, alkaryl, aralkyl and cycloalkyl radicals and one R and one R' can together form an alkylene radical. The epoxy compounds have from 2 to 30 carbon atoms per molecule.

The epoxy compound can be selected from a large group of suitable compounds such as ethylene oxide (oxirane), propylene oxide, 1,2-epoxybutane, 1,2-epoxypentane, 1,2-epoxy-3-methylbutane, 2,3-epoxy-3-methylbutane, 1,2-epoxy-2,4,4-trimethylpentane, 1,2-epoxycyclohexane, 1,2-epoxycyclooctane, 1,2-epoxy-4-cyclohexylpentane, 1,2-epoxyoctadecane, 1,2-epoxyeicosane, styrene oxide, 1,2-epoxytriacontane, 1,2-epoxy-2-cyclohexylbutane, 3,4-epoxy-3,4-diethylhexane, 1,2-epoxy-2-(para-tolyl)butane, 2,3-epoxy-3-methyl-2-benzylpentane, and the like.

Suitable cyclic acid anhydrides which are reacted with the polymer oxy-lithium according to the instant invention can be represented by the general formula shown below:

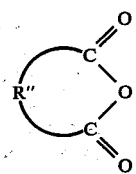

wherein R'' is a divalent hydrocarbyl radical of 2–14 carbon atoms. For ease of handling and mixing efficiency in the reaction of the cyclic acid anhydride with the polymer oxy-lithium it is preferred that the cyclic acid anhydride be at least partially soluble in hydrocarbon solvents such as the paraffinic hydrocarbons or cycloparaffinic hydrocarbons, e.g. cyclohexane. Examples of suitable cyclic acid anhydride compounds include maleic anhydride, succinic anhydride, glutaric anhydride, phthalic anhydride, 3-methylphthalic anhydride, 4-methylphthalic anhydride, cis-hexahydrophthalic anhydride, trans-hexahydrophthalic anhydride, hexahydro-4-methylphthalic anhydride, cis-1,2,3,6-tetrahydrophthalic anhydride, citraconic anhydride, dl-camphoric anhydride, 3-methylglutaric anhydride, methylsuccinic anhydride, 2-dodecen-1-ylsuccinic anhydride and the like.

The amount of epoxy compound to be added in Step One in the reaction with the polymer metal can be conveniently expressed in terms of the molar ratio of epoxy compound to the polymer metal. For maximum carboxy content in the final product the molar ratio of epoxy compound to polymer metal should be at least 1/1. Molar ratios below 1/1 will produce coupled product in the carboxy-containing polymer. Obviously, if coupled product is desired in the final product one can employ ratios below 1/1 as indicated. Broadly the the molar ratio of epoxy compound to polymer metal can be from 0.1/1 up to 5/1 and preferably from 0.8/1 to 2/1. It is believed epoxy compound in excess of the stoichiometric amount 1/1 to convert polymer metal to polymer oxy-metal will not be significantly harmful to the process in terms of the second step reaction.

The temperature employed for the reaction of the epoxy compound with polymer metal can be broadly from 30°–200° C. and preferably from 80°–120° C., more preferably 100°–120° C.

The time employed in the reaction of the epoxy compound with polymer metal is not critical because of the extreme speed of this reaction in the temperature ranges disclosed above. Although the time might be dependent to some extent on the mixing efficiency for the epoxy compound in the polymer metal, suitable times within the range 10 seconds up to 10 minutes can be employed for this reaction step.

The pressure employed for the reaction of the epoxy compound and polymer metal is not believed to be critical and one can employ the autogenous pressure of the system as a matter of convenience. For those epoxy compounds which are relatively volatile it is preferred that the reaction be conducted under the pressure of an inert gas such as nitrogen, helium or argon in order to aid in keeping the epoxy compound in the reaction mixture solution.

In the second step of the instant invention a cyclic acid anhydride is added to the reaction mixture which is obtained from Step One, i.e. the reaction of the epoxy compound with polymer metal to make polymer oxy-metal. This reaction mixture can be treated with the cyclic acid anhydride employing molar ratios of anhydride to starting polymer metal that are the same as the earlier disclosed ratios of epoxy compound to polymer-lithium. Thus a molar ratio of cyclic acid anhydride to polymer metal of 0.1/1 to 5/1 can be broadly employed while preferably the ratio is from 0.8/1 to 2/1.

The temperature employed for the reaction in Step Two can be also the the same as for Step One for both the broad and preferred ranges.

Again the time employed for the reaction is not believed especially critical and the same range can be employed in this step as disclosed for the first step. However, if a cyclic acid anhydride is employed which has low solubility in the reaction mixture additional time can be employed to aid in completing the reaction of the cyclic acid anhydride with the polymer oxy-metal.

The pressure employed in Step Two is not believed to be critical to the practice of this invention.

Following the reaction of the cyclic acid anhydride with the polymer oxy-metal in Step Two of the inventive process the reaction mixture can be treated in a variety of conventional techniques in order to recover the carboxy-containing polymer or even a carboxylate salt if so desired. As noted above the instant invention process is particularly suited to be used with solution polymerization processes which are conducted in the presence of hydrocarbon solvents or diluents. The final reaction mixture thus will be a hydrocarbon solution or dispersion of the polymer carboxylate salt. This polymeric solution or dispersion can be conveniently handled by steam stripping techniques which are well known in the art of solution polymerization for recovering polymers from hydrocarbon solvents. During the steam stripping procedure the carboxylate salt may be substantially converted to the polymer carboxylic acid material. If appreciable metal ions are present during the steam stripping operation it is possible that another carboxylate salt may be formed and recovered in the steam stripping procedure. Another well known procedure for recovering polymers from hydrocarbon solutions is to add a nonsolvent for the polymer such as alcohols, water, and the like to the hydrocarbon solution thus precipitating or coagulating the polymer. If the the precipitation or coagulation is carried out in the presence of a mineral acid the carboxy-containing polymer will result. If no acidic compound is present then there may be recovered the carboxylate salt of the polymer material.

The by weight percentage of polymer produced having carboxy attached thereto can be quite high, for instance 40 to 99 percent or more generally 60 to 95 percent. Preferably at least 75 percent is produced.

Antioxidants and/or other polymer stabilizers may be added during the polymer recovery step as is known in the art.

In the examples that follow the method employed for determining the weight percent polymer with carboxy end groups is described as follows. The determination is for the weight percent polymer with carboxy ends not the weight percent carboxy content.

The rubber is dissolved, an internal standard added, and then chromatographed on columns that pass the carboxy polymer and again on columns that retain the carboxy polymer. The areas of the product peaks are measured relative to the internal standard and the weight percent carboxy polymer is calculated. The apparatus and reagents are as follows:

1. Standard solution—polystyrene 20,000±5,000 molecular weight dissolved (0.006 g/mL) in chloroform.
2. Solvents—tetrahydrofuran, methanol, chloroform (HPLC grade made by Fisher Scientific).
3. Gel permeation chromatograph with a UV detector and a switching valve to two sets of columns. One set of columns must be DuPont size exclusion columns (SEC) to retain carboxy ended polymer; i.e., 60-100-500-1000-1000 worked well. The other set should be micro styragel type or non-functional SEC type columns to chromatograph the total polymer, i.e., three 500 SEC columns.

The procedure is as follows:

1. The SEC columns are "activated" to hold the carboxy ended polymer by pumping methanol for 30 minutes and then chloroform until a steady base line is obtained, 30–60 minutes. Columns must be "reactivated" with methanol after 6 to 10 samples are run.
2. Polymer solution (18% in cyclohexane), 2 mL, is mixed with internal standard solution, 3.5 mL.
3. Add 0.6 mL of the step B 2 mixture to 20 mL of THF and chromatograph on the THF microstyragel columns for total polymer.
4. Add 0.6 mL of the step 2 mixture to 20 mL of chloroform and chromatograph on the SEC columns with CHCl$_3$ carrier. This holds the carboxy polymer on the packing, allowing the amount of non-functional polymer to be measured.

The equation for calculating percent carboxy polymer is as follows:

$$100 \frac{(A/B - C/D)}{A/B} = \% \text{ carboxy polymer}$$

where A is the area under the first peak (product) of the carboxylated polymer purged through THF columns, B is the area under the second (standard) peak for carboxylated polymer passed through THF columns, C is the area under the first (product) peak of the carboxylated polymers retained chloroform columns and D is the area under the second (standard) peak of the carboxylated polymer retained chloroform columns.

Care must be taken not to get any THF in the chloroform sample or into the chloroform columns or the carboxy polymer will bleed out and percent carboxy polymer calculations will be low.

EXAMPLE I (CONTROL)

A series of runs was conducted using a 0.5 gallon Chemco reactor wherein (85/15) butadiene/styrene block copolymers were prepared in cyclohexane solution with n-butyllithium initiator. The active polymerlithium mixtures were reacted with ethylene oxide and the polymer oxy-lithium mixtures then treated with several different hydrolysis reagents (aq. HCl, aq. acetic acid, and H₂O) to convert polymer-OLi to polymer-OH. The mixtures were then reacted with hexahydro-4-methylphthalic anhydride. Polymer samples were obtained at various reaction times from this final mixture and analyzed for carboxy content.

The polymerization recipe, conditions and details of the reactions are presented below. The results obtained are presented in Table I.

| | Polymerization Recipe |
|---|---|
| Cyclohexane, g | 650 |
| Tetrahydrofuran[a], g | 0.05 |
| Styrene, g | 15 |
| n-Butyllithium[b], mhm[c] | 1.2[d] |
| (Polymerize 15 min. at 70° C.) | |
| 1,3-Butadiene, g | 85 |
| (Polymerize 5–7 min. to peak temperature of 110° C.) | |
| Ethylene oxide[e], mhm | 1.0 |
| (React 5 min.) | |
| Hydrolysis Reagent | variable |
| (React 5 min. at 110° C.) | |
| H—4-MPA[f], mhm | 2.0 |
| (React at 100° C., sample at indicated intervals for carboxy group analysis) | |

[a]Charged as a solution of THF in cyclohexane, 0.01 g per mL.
[b]Charged as a 0.262 M solution in heptane/cyclohexane mixture.
[c]mhm = gram millimoles per 100 g of total monomers.
[d]Estimated 0.2 mhm for scavenger level and 1.0 mhm as effective initiator level.
[e]Charged as 0.5 M solution in cyclohexane.
[f]H—4-MPA = hexahydro-4-methylphthalic anhydride charged as 0.5 M solution in cyclohexane.

TABLE I

| Run No. | Hydrolysis Reagent, mhm | Reaction Time, min. | Carboxy % |
|---|---|---|---|
| 1 | 12.0 M HCl, 2.0 | 20 | −2.6[a] |
| | | 60 | −0.3 |
| 2 | 17.4 M Acetic Acid, 2.0 | 20 | 5.8 |
| | | 60 | 3.6 |
| 3 | H₂O[b], 1.0 | 20 | —[c] |
| | | 60 | −0.8 |

[a]A negative value indicates no detectable carboxy content.
[b]Charged as a solution in THF, 0.01 g/mL.
[c]A dash—indicates not determined.

The results in Table I show that conditions which should have been effective to convert polymer-OLi to polymer-OH prior to reaction with the cyclic acid anhydride were certainly not conducive to the production of polymers having a high carboxy content, only about 4–6% being obtained at best under the conditions employed.

EXAMPLE II

A run was made according to this invention in the 0.5 gallon Chemco reactor wherein polymer-OLi was reacted directly with H-4-MPA, i.e., without an intermediate step to hydrolyze polymer-OLi to polymer-OH. The polymerization recipe is shown below and the results are shown in Table II.

| | Polymerization Recipe |
|---|---|
| Cyclohexane, g | 650 |
| THF, g (0.01 g/mL in cyclohexane) | 0.07 |
| Styrene, g | 15 |
| n-BuLi, mhm (0.25 M solution in heptane/cyclohexane mixture, 0.10 mhm scavenger level) | 1.03 |
| (Polymerize for 10 min. at 70° C.) | |
| 1,3-Butadiene, g | 85 |
| (Polymerize 3–5 min. to peak of 105° C.) | |
| Ethylene oxide, mhm (0.5 M in cyclohexane) | 1.2 |
| (React 3–5 min. at 105° C.) | |
| H—4-MPA, mhm (0.4 M in cyclohexane) | 1.2 |

React at 100°–105° C. for indicated time and samples withdrawn for carboxy content analysis. BHT (antioxidant) was added to each sample at a level of 1 phr.

TABLE II

| Run No. | Reaction Time, Min. | Carboxy Content % |
|---|---|---|
| 1 | 0[a] | −2.05 |
| 2 | 5 | 84.4 |
| 3 | 10 | 86.9 |

[a]Sampled prior to addition of H—4-MPA.

The results in Table II show that the inventive method provides polymers with a very high carboxy content.

EXAMPLE III

Additional runs were made according to the invention in a 2 gallon Chemco reactor to prepare large samples of carboxy-containing polymer for evaluation in thermosetting unsaturated polyester resin composition. The polymerization recipe is shown below and the results are presented in Table III.

| | Polymerization Recipe |
|---|---|
| Cyclohexane, g | 3,900 |
| THF, g (0.01 g/mL in cyclohexane) | 0.42 |
| Styrene, g | 90 |
| n-BuLi, mhm (0.517 M in heptane/cyclohexane mixture, 0.15 mhm scavenger level) | 0.88–1.00 |
| (Polymerize 10 min. at 70° C., cool to 60° C.) | |
| 1,3-Butadiene, g | 510 |
| (Polymerize to peak temperature of 110° C.) | |
| Ethylene oxide (0.5 M in cyclohexane) | 1.2 |
| (React 2 min.) | |
| H—4-MPA, mhm (0.4 M in cyclohexane) | 1.2 |
| (React 5 min., cool to 70° C.) | |
| BHT (antioxidant), g | 2.4 |

Polymer was recovered by steam stripping using the following recipe charged to the stripper.

| Polymer solution, g | 2,600 |
|---|---|
| CaCl₂, g | 0.54 |

-continued

| | |
|---|---|
| Tamol, g | 0.37 |
| Water, gallons | 3.3 |

It was noted that Tamol (dispersant) was not necessary to provide crumb formation in the steam stripping operation.

Batches from individual polymerization runs were combined to provide two polymers which differed primarily only in molecular weight.

TABLE III

| Polymer | Unsaturation[a], % Trans | Vinyl | Styrene, % Block[b] | Total[c] | HI[d] | I.V.[e] | Carboxy Content % |
|---|---|---|---|---|---|---|---|
| A | 50.0 | 12.2 | 13.5 | 14.4 | 1.05 | 1.16 | 82.7 |
| B | 49.2 | 12.2 | 14.4 | 14.2 | 1.07 | 1.05 | 82.4 |

[a]Normalized values, based on butadiene portion of the polymer, as determined by infrared spectra analysis.
[b]Determined by oxidative degradation.
[c]Determined by ultraviolet spectra anlysis.
[d]HI = heterogeneity index, ratio of wt. average molecular weight to number average molecular weight (Mw/Mn).
[e]I.V. = inherent viscosity determined in toluene. Each polymer was gel free.

Polymer A was evaluated in a thermosetting unsaturated polyester resin composition in a system similar to that in the Example of U.S. Pat. No. 4,020,036, the disclosure of which patent is hereby incorporated by reference. Polymer A was found to be entirely suitable for said application. Polymer B, while also suitable for this application, did not give as good results in terms of appearance aspects of the moldings.

EXAMPLE IV

Since the carboxy group in the polymers made according to the instant invention is apparently also accompanied by an ester group by virtue of the opening of the cyclic acid anhydride, it was desirable to test the stability of the ester group toward polymer treatment procedures.

A portion of polymer A (Example III) as water wet crumb from the steam stripping recovery step was charged to an internal mixing device (Midget Banbury). The polymer was mixed at 165°–175° C. and samples removed at different times to determine carboxy content. Results of this test are presented in Table IV.

TABLE IV

| Sample No. | Mixing Time, min. | Carboxy Content, % |
|---|---|---|
| 1 | 1 | 90.9[a] |
| 2 | 5 | 88.3[a] |
| 3 | 10 | 84.3[a] |
| 4 | 11 | 79.8[b] |
| 5 | 15 | 64.6[b] |
| 6 | 20 | 54.5[b] |
| 7 | 25 | 46.3[b] |
| 8 | 0 (control) | 86.8 |

[a]Banbury only partially filled.
[b]Banbury filled.

The results in Table IV show that under the severe conditions of high shear mixing at high temperature for an extended period the carboxy content was reduced about 50%. However, it should be noted that typical residence times for an extruder drying operation or a pelletizing extruder for such polymers is on the order of 1–3 minutes. Under such conditions very little loss of carboxy content would be expected due to the cleavage of the polymer-ester linkage.

EXAMPLE V

Other runs were made according to this invention in which propylene oxide and ethylene oxide were compared in the first step of the inventive process. A control run was also included in this series which employed $CO_2$ in place of the cyclic acid anhydride in the second step of the process. The polymerization recipe is shown below and the results obtained are provided in Table V.

| | Polymerization Recipe |
|---|---|
| Cyclohexane, g | 650 |
| Styrene, g | 15 |
| THF[a], g | 0.07 |
| n-BuLi[b], mhm | variable |
| (Polymerize at 70° C. for 10 min.) | |
| 1,3-Butadiene, g | 85 |
| (Polymerize about 7 min. to peak temperature 110° C.) | |
| Propylene oxide (PO)[c] or | variable |
| Ethylene oxide (EO)[c], mhm | |
| (React 3–5 min.) | |
| H—4-MPA[c] or $CO_2$ | variable |
| (React 3–5 min. except Runs 5 and 6) | |
| Sample and add BHT, g | 0.4 |

[a]Charged as a solution in cyclohexane 0.01/g per mL.
[b]Charged as a 0.265 M solution in heptane/cyclohexane mixture. Scavenger level estimated at 0.20 mhm.
[c]Charged as 0.5 M solution in cyclohexane.

TABLE V

| Run No. | n-BuLi mhm | PO mhm | EO mhm | H—4-MPA mhm | Polymer Carboxy, % | Coupled[a] % |
|---|---|---|---|---|---|---|
| 1 | 1.08 | 0.88 | — | 0.88 | 58 | 5.5 |
| 2 | 1.20 | 0.55 | — | 1.00 | 54 | 26 |
| 3 | 1.08 | — | 0.88 | 0.88 | 83 | 2.0 |
| 4 | 1.20 | — | 0.55 | 1.00 | 45 | 34 |
| 5 | 1.08 | 0.88 | — | 0.88 | 55.4 | — |
| (Samples taken at 0.5, 3.5 7.5 12.5 and 20 min. after H—4-MPA addition) | | | | | 64.8 67.0 66.0 | — — — |
| 6[b] | 1.08 | — | 0.88 | — | 9.6 | — |

[a]Percent of polymer chains that have coupled during the reaction sequence as determined by gel permeation chromatography using THF as solvent.
[b]Run made using $CO_2$ instead of H—4-MPA by charging $CO_2$ at 50 psig and maintaining this pressure until no more is consumed.

The results in Table V show that ethylene oxide gave better results than propylene oxide in terms of polymer carboxy content (Runs 1 and 3). It is also seen that molar ratios of epxoy compound to polymer metal (effective n-BuLi level) less than 1/1 can give rise to increased coupled product and decreased carboxy content (Runs 1 and 2; 3 and 4). Run 5 shows that the reaction of polymer-OLi with H-4-MPA is essentially complete in about 4 minutes under the conditions employed. Control Run 6 shows that use of $CO_2$ in place of a cyclic acid anhydride (H-4-MPA) did not give polymer product with a high carboxy content.

EXAMPLE VI

Runs were made in a 0.5 gallon Chemco reactor according to the invention to evaluate methods of treating propylene oxide prior to use in Step One of the inventive process. In addition, phthalic anhydride was used as the cyclic acid anhydride in one run of the series. The polymerization recipe is shown below and the results are presented in Table VI.

| | Polymerization Recipe |
|---|---|
| Cyclohexane, g | 650 |
| Styrene, g | 15 |
| THF[a], g | 0.07 |
| n-BuLi[b], mhm | 1.38 |
| (Polymerize 10 min. at 70° C.) | |
| 1,3-Butadiene, g | 85 |
| (Polymerize several min. to peak temperature of 100–110° C.) | |
| Propylene oxide (PO) or Ethylene oxide (EO) | variable |
| (React 3–5 minutes) | |
| H—4-MPA, except Run 9 | variable |
| (React 3–5 minutes) | |

[a]Charged as solution in cyclohexane, 0.01 g/mL.
[b]Charged as 0.28 M solution in heptane/cyclohexane mixture. Scavenger level was estimated at 0.5 mhm.

TABLE VI

| | | | | Polymer | |
|---|---|---|---|---|---|
| Run No. | PO mhm | EO mhm | H—4-MPA mhm | Carboxy Content, % | Coupled, % |
| 1 | — | 0.88[a] | 0.88 | 69.1 | — |
| 2 | 0.88[a] | — | 0.88 | 50.2 | — |
| 3 | 1.76[a] | — | 0.88 | 73.6 | — |
| 4 | 0.88[b] | — | 0.88 | 61.5 | — |
| 5 | 0.88[c] | — | 0.88 | 28.6 | — |
| 6 | — | 1.76[a] | 1.76 | 97.0 | — |
| 7 | 1.76[b] | — | 1.76 | 90.5 | — |
| 8 | 1.76[b] | — | 1.76 | 85.4 | — |
| 9 | — | 1.76[a] | 1.76 (PA)[d] | 42.7 | 23 |

[a]Untreated.
[b]Treated over type 5A molecular sieves.
[c]Treated over Kaiser A201 activated alumina.
[d]PA = phthalic anhydride, charged as 0.343 M solution in THF.

The results in Table VI show treatment of propylene oxide over activated alumina was not helpful but that treatment over molecular sieves was helpful in terms of carboxy content of the final product. Untreated ethylene oxide still gave slightly better results than propylene oxide treated with molecular sieves. It is also seen again that molar ratios of epoxy compound to effective n-BuLi (polymerlithium) of greater than 1/1 were effective in giving high levels of carboxy content in the polymer. Run 9 shows that phthalic anhydride can be employed as the cyclic acid anhydride according to the process of this invention although the results were not outstanding in terms of carboxy content.

EXAMPLE VII

Control runs were made in the 0.5 gallon Chemco reactor to determine the effect of omitting Step One from the sequence of the invention process. The polymerization recipe is shown below and the results are provided in Table VII.

| | Polymerization Recipe |
|---|---|
| Cyclohexane, g | 975 |
| Styrene, g | 19.5 |
| THF[a], g | 0.105 |
| n-BuLi[b], mhm effective | 1.0 |
| (Polymerize 15 min. at 70° C.) | |
| 1,3-Butadiene, g | 127.5 |
| Styrene, g | 3.0 |
| (Polymerize about 10 min. to 100–110° C.) | |
| H—4-MPA[c] or citraconic anhydride[d], mhm | variable |
| (React several minutes, recover polymer) | |

TABLE VII

| | | Polymer | |
|---|---|---|---|
| Run No. | Anhydride, (mhm) | Carboxy Content, % | Coupled, % |
| 1 | H—4-MPA (4) | 29.6 | 46 |
| 2 | citraconic (11.4) | 28.1 | 75 |

[a]Charged as solution in cyclohexane of 0.01 g/mL.
[b]Charged as 0.435 M solution in heptane/cyclohexane mixture.
[c]Charged as 0.4 M solution in cyclohexane.
[d]Charged as the neat compound. The compound did not appear to be very soluble in cyclohexane (reaction mixture).

The results in Table VII show that the omission of the epoxy compound reaction with polymerlithium before the addition of the cyclic acid anhydride does not provide as high a yield of carboxy content in the polymer product but does show a relatively high degree of coupled polymer.

EXAMPLE VIII

Scaled up polymerization reactions were utilized to prepare about 100 kg of carboxy containing polymer made according to the invention. The polymerization recipe and reaction sequence was substantially the same as that shown below.

| Polymerization Recipe | |
|---|---|
| | Parts by wt. |
| Solvent | 650 |
| THF | 0.07 |
| Styrene | 15 |
| n-BuLi | 0.082 |
| (0.026 scavenger level, 0.056 effective) | |
| (Polymerize about 10 min. initiated at 50–60° C.) | |
| 1,3-Butadiene | 85 |
| (Polymerize to peak temperature of 100–110° C.) | |
| Ethylene Oxide (at peak temp.) | 0.039 |
| (React 2 min.) | |
| H—4-MPA | 0.15 |
| (React at least 0.5 min., flash solvent, discharge to blend tank) | |
| BHT | 0.40 |

In the recipe shown above the molar ratio of ethylene oxide to polymerlithium (effective n-BuLi) is 1/1 and the molar ratio of H-4-MPA to polymerlithium is also 1/1. These ratios were employed in order to reduce the possibility that unreacted ethylene oxide or H-4-MPA would be present and perhaps carried over with the flashed solvent to recycle streams.

The polymer had the properties shown below:

| Normalized unsaturation | |
|---|---|
| % Trans | 40.2 |
| % Vinyl | 10.1 |
| Total styrene, % | 13.5 |
| Block polystyrene, % | 13.2 |
| Mw/Mn × $10^{-3}$ | 109/101 |
| Heterogeneity index | 1.07 |
| Inherent viscosity | 1.15 |
| 325 mesh gel, % | 0 |
| Carboxy content, % | 74 |
| Coupled polymer, % | <2 |
| Viscosity of 30 wt. % solution | 31,700 |

| -continued |
|---|
| in Styrene at 25° C., cP |

This polymer was evaluated in a thermosetting polyester sheet molding composition in a system similar to that of the Example of U.S. Pat. No. 4,020,036. This polymer evaluation demonstrated that the product was entirely satisfactory as an additive for the unsaturated polyester sheet molding composition.

While this invention has been described in detail for the purpose of illustration, it is not to be construed as limited thereby but is intended to cover all changes and modifications within the spirit and scope thereof.

I claim:

1. A polymerization process comprising:
   introducing an organolithium initiator into a reaction zone containing a hydrocarbon solvent; introducing a conjugated diene monomer having 4 to 8 carbon atoms per molecule into said reaction zone and carrying out polymerization;
   thereafter introducing an epoxy compound and mixing the resulting ingredients at a temperature of 30° to 200° C., said epoxy compound having the formula

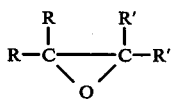

wherein each R and each R' is selected from the group consisting of hydrogen, alkyl, aryl, alkaryl, aralkyl and cycloalkyl radicals and one R and one R' can together form an alkylene radical; thereafter directly contacting the thus formed intermediate with a cyclic acid anhydride and mixing at a temperature of 30° to 200° C., said cyclic acid anhydride having the formula

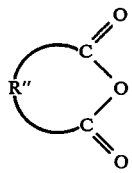

wherein R" is a divalent hydrocarbyl radical of 2 to 14 carbon atoms; subjecting the resulting composition to steam stripping or precipitation in the presence of an acid, to produce a carboxy containing rubbery polymer.

2. A method according to claim 1 wherein said conjugated diene and a monovinyl substituted aromatic compound are sequentially introduced into said solvent and wherein said resulting composition is subjected to steam stripping.

3. A process according to claim 2 wherein said epoxy compound is selected from ethylene oxide, propylene oxide, 1,2-epoxybutane, 1,2-epoxypentane, 1,2-epoxy-3-methylbutane, 2,3-epoxy-3-methylbutane, 1,2-epoxy-2,4,4-trimethylpentane, 1,2-epoxycyclohexane, 1,2-epoxycyclooctane, 1,2-epoxy-4-cyclohexylpentane, 1,2-epoxyoctadecane, 1,2-epoxyeicosane, styrene oxide, 1,2-epoxytriacontane, 1,2-epoxy-2-cyclohexylbutane, 3,4-epoxy-3,4-diethylhexane, 1,2-epoxy-2-(para-tolyl)-butane, and 2,3-epoxy-3-methyl-2-benzylpentane.

4. A method according to claim 2 wherein said cyclic acid anhydride is selected from maleic anhydride, succinic anhydride, glutaric anhydride, phthalic anhydride, 3-methylphthalic anhyride, 4-methylphthalic anhydride, cis-hexahydrophthalic anhydride, trans-hexahydrophthalic anhydride, hexahydro-4-methylphthalic anhydride, cis-1,2,3,6-tetrahydrophthalic anhydride, citraconic anhydride, dl-camphoric anhydride, 3-methylglutaric anhydride, methylsuccinic anhydride, and 2-dodecen-1-ylsuccinic anhydride.

5. A method according to claim 2 wherein said organolithium compound is n-butyllithium.

6. A method according to claim 2 wherein said monovinyl substituted aromatic compound is styrene.

7. A method according to claim 2 wherein said conjugated diene is selected from 1,3-butadiene and isoprene.

8. A method according to claim 2 wherein said hydrocarbon solvent is cyclohexane.

9. A method according to claim 2 wherein said epoxy compound is selected from ethylene oxide, propylene oxide, 1,2-epoxybutane, 1,2-epoxypentane, 1,2-epoxy-3-methylbutane, 2,3-epoxy-3-methylbutane, 1,2-epoxy-2,4,4-trimethylpentane, 1,2-epoxycyclohexane, 1,2-epoxycyclooctane, 1,2-epoxy-4-cyclohexylpentane, 1,2-epoxyoctadecane, 1,2-epoxyeicosane, styrene oxide, 1,2-epoxytriacontane, 1,2-epoxy-2-cyclohexylbutane, 3,4-epoxy-3,4-diethylhexane, 1,2-epoxy-2-(para-tolyl)-butane, and 2,3-epoxy-3-methyl-2-benzylpentane; and wherein said cyclic anhydride is selected from maleic anhydride, succinic anhydride, glutaric anhydride, phthalic anhydride, 3-methylphthalic anhydride, 4-methylphthalic anhydride, cis-hexahydrophthalic anhydride, trans-hexahydrophthalic anhydride, hexahydro-4-methylphthalic anhydride, cis-1,2,3,6-tetrahydrophthalic anhydride, citraconic anhydride, dl-camphoric anhydride, 3-methylglutaric anhydride, methylsuccinic anhydride, and 2-dodecen-1-ylsuccinic anhydride, and wherein said organolithium compound is n-butyllithium, said solvent is cyclohexane, and said mixing of said epoxy compound and said mixing of said cyclic acid anhydride are carried out at a temperature of 80° to 120° C.

10. A method according to claim 9 wherein said carboxy containing polymer constitutes at least 75 percent of total polymer produced by said process.

11. A method according to claim 2 wherein said carboxy containing polymer constitutes 60 to 95 percent of total polymer produced by said process.

12. A method according to claim 2 wherein said carboxy containing polymer has a 90 to 80 weight percent diene and a 10 to 20 weight percent monovinyl substituted aromatic compound content and wherein a molar ratio of said epoxy compound to polymer lithium produced by said polymerization is within the range of 0.8/1 to 2/1 and wherein a molar ratio of said cyclic acid anhydride to said polymer lithium is within the range of 0.8/1 to 2/1.

13. A product produced by the method of claim 1.

14. A polymerization process comprising:
   introducing n-butyllithium initiator into a reaction zone;
   sequentially introducing styrene and then butadiene and carrying out polymerization in cyclohexane solution;
   thereafter introducing ethylene oxide or propylene oxide and mixing the resulting ingredients at a temperature of 100°-120° C.;
   directly thereafter introducing hexahydro-4-methylphthalic anhydride and mixing at a temperature of 100°-120° C.;
   subjecting the resulting composition to steam stripping; and
   recovering a polymer.

15. A polymer produced by the method of claim 14.

* * * * *